United States Patent [19]

Rothlisberger et al.

[11] 3,909,845

[45] Sept. 30, 1975

[54] APPARATUS AND METHOD FOR SENSING THE CONDITION OF A TAPE WITHIN A TAPE CASSETTE

[75] Inventors: Kurt Rothlisberger, Morton Grove; Richard F. Vee, Chicago, both of Ill.

[73] Assignee: Teletype Corporation, Skokie, Ill.

[22] Filed: June 14, 1974

[21] Appl. No.: 479,682

[52] U.S. Cl. ........................ 360/74; 360/72; 360/93

[51] Int. Cl.[2] ..................... G11B 15/08; G11B 15/66; G11B 23/04

[58] Field of Search ............. 360/74, 71, 72, 90, 93, 360/96, 132; 242/197–200, 186, 188; 352/72

[56] References Cited

UNITED STATES PATENTS

| | | | |
|---|---|---|---|
| 3,417,938 | 12/1968 | Markakis et al. | 360/71 |
| 3,619,625 | 1/1969 | Wood | 360/71 |
| 3,675,876 | 7/1972 | Frederick | 360/74 |
| 3,686,470 | 8/1972 | Stahlberg et al. | 360/96 |
| 3,766,327 | 10/1973 | Johnson | 360/96 |

FOREIGN PATENTS OR APPLICATIONS

| | | |
|---|---|---|
| 1,254,377 | 11/1967 | Germany |

*Primary Examiner*—Alfred H. Eddleman
*Attorney, Agent, or Firm*—W. K. Serp; J. L. Landis

[57] ABSTRACT

A device for sensing the condition of a magnetic tape maintained within a conventional tape cassette, the tape having transparent leaders and an opaque magnetized portion. The cassette is positioned on a cradle having a loading and a record-playback position. In response to movement of the cradle to the record-playback position a casing carrying a light sensor is inserted into the capstan drive aperture of the cassette. The cradle carries a light source which is positioned proximate the location of the sensor with the magnetic tape located between the sensor and the light source. The sensor produces a control signal in response to a change in the light transmitting characteristics of the tape.

16 Claims, 6 Drawing Figures

APPARATUS AND METHOD FOR SENSING THE CONDITION OF A TAPE WITHIN A TAPE CASSETTE

BACKGROUND OF THE INVENTION

This invention generally relates to an apparatus and method for sensing the condition of a magnetic tape carried in a tape cassette and more particularly relates to a method and apparatus for sensing the presence of the transparent leader of a tape carried in a tape cassette at a preselected sensing station.

Various media have been suggested and used for recording digital information. A particular medium finding increased usage is a tape cassette. Digital cassettes are similar in construction to audio cassettes which have enjoyed increasing commercial acceptance over the past ten years. The construction and operational features of such digital cassettes are akin to the audio types with the additional consideration that much higher mechanical and electrical standards are maintained. Several arrangements have been suggested for driving the tape carried in the cassette across a playback record head. One such device drives the tape by means of a capstan and cooperating pinch roller. A particular disadvantage with this arrangement is that the capstan and pinch roller introduce considerable tape wear. Additionally, during the recording of digital information, discrete portions of the tape are often rapidly selected. Such rapid selection is difficult to obtain with capstan drive. Alternatively, certain digital cassette recorders have driven the tape directly by means of the cassette drive and take-up reels. To prevent the tape from being torn or ripped off of the reels when the end of the tape is reached, the tape driving force must be interrupted or reversed before the end of the tape is reached.

The illustrated embodiment provides a unique and improved means for sensing the condition of a tape; that is, its position relative to a preselected sensing station so as to eliminate overdrive of the tape reels and thus prevent possible damage to the tape.

SUMMARY

Disclosed is an apparatus for sensing the condition of the tape within a cassette at a preselected sensing station external to the cassette. A cradle is provided for receiving the tape cassette; the cradle having loading and record-playback positions. Means is included which is responsive to the positioning of the cradle from the loading to the record-playback position for sensing the condition of the tape with respect to the sensing station.

The condition sensing means is responsive to a change in the light transmitting qualities of the tape within the cassette proximate the sensing station and includes a light sensor positionable from a first position outside of the cradle to a second position within the cradle. Light transmitting means is located on the cradle so that when the light sensor is positioned within the cavity, the tape carried within the cassette is located in the light path from the light source to the light sensor. A change in the opacity of the tape produces a signal which by means of suitable control circuitry interrupts the direction of tape travel thus preventing tape overdrive.

DETAILED DESCRIPTION

-General-

Figure 1:
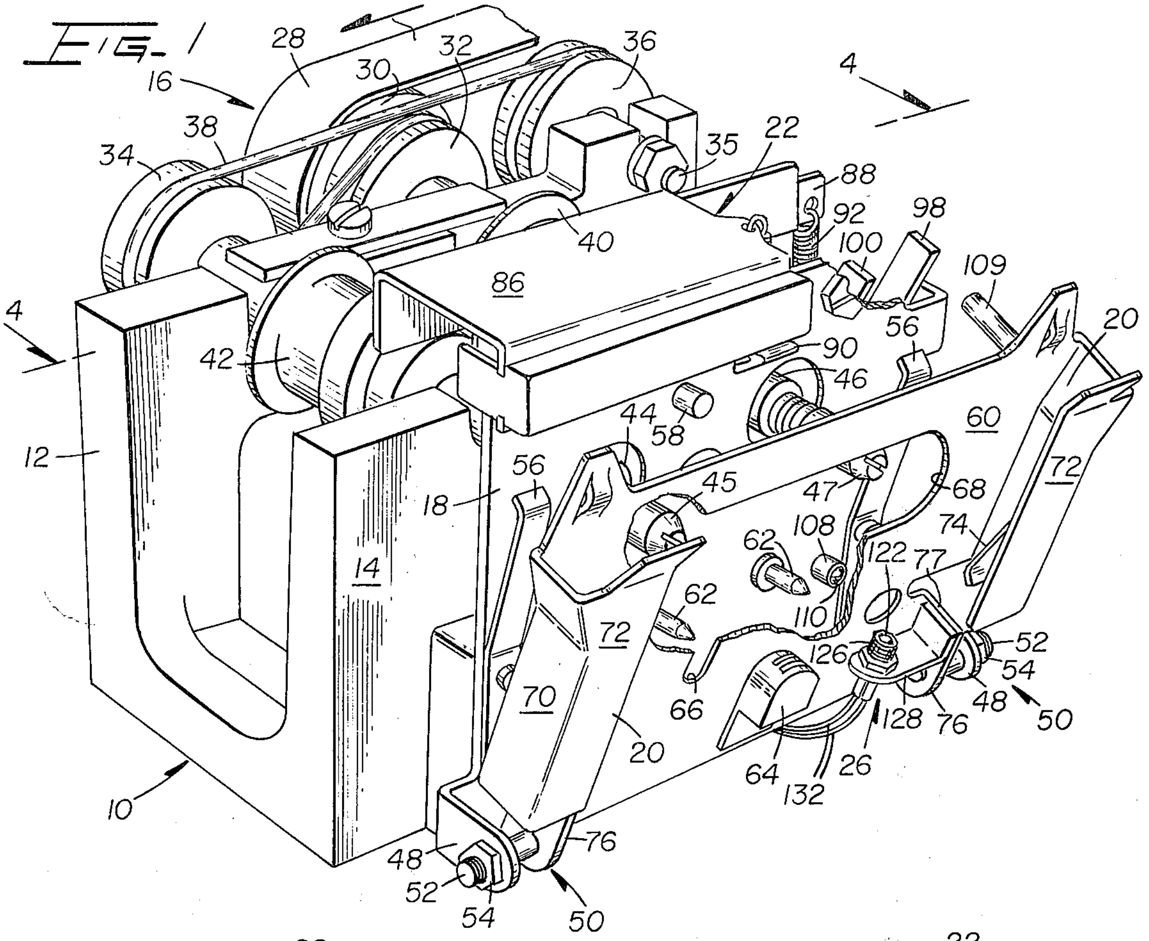
FIG. 1 is a pictorial view of a cassette handling apparatus including certain features of this invention.
Figure 2:
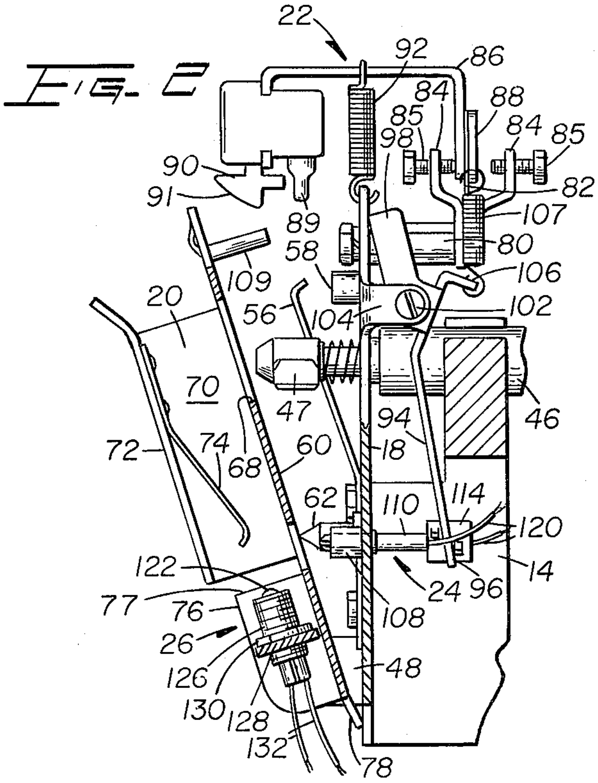
FIG. 2 is a partially sectionalized right end view of the apparatus of FIG. 1 illustrating a first operational position.
Figure 3:
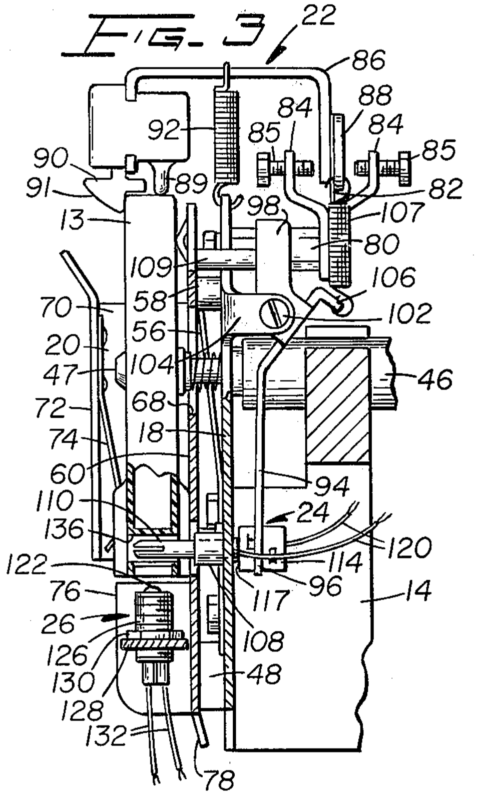
FIG. 3 is a partially sectionalized right end view of the apparatus of FIG. 1 including a conventional tape cassette illustrating a second operational position.
Figure 4:
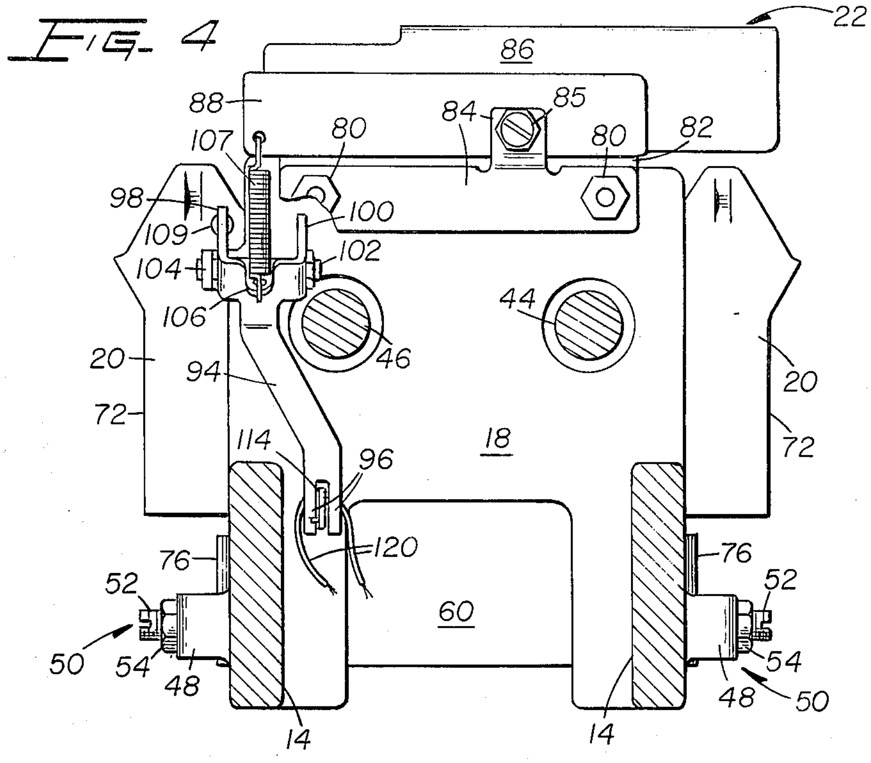
FIG. 4 is a sectional view taken along line 4—4 of the apparatus of FIG. 3.
Figure 6:
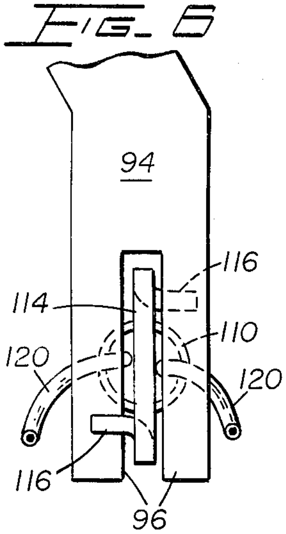
FIG. 6 is a fragmentary view of a component of the apparatus of FIG. 5 taken along the line 6—6.

With particular reference to FIGS. 1 and 2, the illustrated apparatus includes a U-shaped support frame 10 one end of which defines an upwardly projecting drive assembly support leg 12. The remaining end of the support frame 10 defines a cradle assembly support leg 14. Mounted upon the drive assembly support leg 12 is a take-up and rewind drive mechanism 16 which serves to drive the take-up and rewind reels of a conventional tape cassette 13. Mounted upon the cradle support leg 14 is a support plate 18 having a cradle 20 pivotably secured thereto. The cradle 20 defines a cavity adapted to receive and generally orient the cassette 13, when the cradle 20 is swung from the open or loading position of FIG. 2 to a closed or operating position of FIG. 3. A cassette locking mechanism 22 serves to hold and retain the cassette 13 in the operating position (FIG. 3). Additionally, means are mounted upon the support plate for sensing the tape condition of the tape within the cassette 13. A sensor 24 is introduced into the cradle 20 and into the body of the cassette as the cradle is swung from the loading to the operating position. A light source 26 is carried by the cradle 20 and when the cradle is in the operating position the light source 26 and sensor 24 are in alignment with the cassette tape positioned therebetween. In this manner, a change in the light transmitting qualities of the tape is detected and used to control the tape drive mechanism 16. For a more detailed description of certain of the components illustrated in FIG. 1, reference is made to copending U.S. patent application entitled "Cassette Loading Cradle" by K. Rothlisberger and R. F. Vee filed simultaneously herewith and incorporated herein by reference.

-Drive Assembly-

The tape drive mechanism 16 is driven by a drive belt 28 coupled to a suitable motor (not shown) and engages the outer surface of a drive drum 30. The drive drum 30 and a grooved drive pulley 32 are integrally mounted upon a common drive shaft supported for rotational movement with respect to the drive assembly support leg 12. Similarly, a take-up pulley 34 is mounted on a take-up shaft rotationally journalled to the drive assembly support leg 12. The drive mechanism 16 additionally includes an idler pulley 36 coupled to the drive pulley 32 and the take-up pulley 34 by means of a continuous drive belt 38. The drive pulley 32 is rotatably supported on the drive assembly support leg 12. It will be appreciated that the particular pulley and belt configuration described results in opposite rotational movement of the drive pulley 32 with respect to the take-up pulley 34.

As illustrated in FIG. 1, the drive shaft is coupled to the field of an electromagnetic drive clutch 40 which is mounted to the forward surface of the drive assembly support leg 12. Similarly, the take-up shaft is coupled to the field of an electromagnetic take-up clutch 42 which is similarly secured to the forward surface of the drive assembly support leg 12. The clutches 40 and 42 are controlled by suitable circuitry (not shown) and alternately actuated to select the drive and take-up operational modes of the apparatus. Secured to the rotor of the take-up clutch 42 is a take-up shaft 44 which is journalled through the cradle support leg 14 and through an opening defined by the cradle support plate 18. The end of the take-up shaft is terminated by a yieldable splined take-up spindle 45 for engagement with the take-up reel of a conventional tape cassette. Similarly, the rotor end of the electromagnetic drive clutch 40 carries a drive shaft 46 which passes through the cradle support leg 14 and through the opening defined by the cradle support plate 18. The end of the drive shaft 46 is similarly terminated by a splined yieldable drive spindle 48 adapted to engage the drive reel of a tape cassette.

-Cradle Assembly-

The rectangularly shaped cradle support plate 18 is secured to the forwardly disposed surface of the cradle assembly support leg 14 with the plane of the support plate substantially normal to the axes of the drive 46 and take-up 44 shafts. To facilitate relative arcuate movement between the cradle 20 and the support plate 18, the lower end of the support plate 18 is formed to define a pair of opposed outwardly projecting brackets 48 which form a portion of a cradle support hinge 50. Each of the brackets 48 are tapped to receive a pair of coaxially oriented, threaded cradle support hinge pins 42. The ends of the pins 52 are positioned to engage mating openings formed in the cradle 20 as will be subsequently be further described. Serving to prevent vibrational movement of the hinge pins 52 are lock nuts 54 which are threaded about the pins 52 and tightened against the outwardly disposed surface of the respective cradle support bracket 48. The cradle 20 is biased away from the support plate 18 about the hinge pins and toward a loading position (FIG. 2) by a pair of resilient leaf springs 56. The leaf springs 56 are mounted to the forward surface of the cradle support plate 18 and extend toward the cradle 20. Limiting pivotal movement of the cradle 20 towards the surface of the cradle support plate 18 is a cradle stop pin 58 which is secured to the wall of the support plate 18 and projects outwardly therefrom. The length of the stop pin 58 is selected with respect to the location of the hinge pins 52 so that when the cradle 20 abuts the end of the stop pin 58, the plane of a rear wall 60 of the cradle 20 will be substantially parallel to the plane of the cradle support plate 18 and thus normal to the axes of the take-up 44 and drive 46 shafts.

Serving to guide and position a cassette within the cradle 20 are a pair of spatially positioned forwarding projecting conical guide pins 62 secured to the outer surface of the cradle support plate 18. The pins 62 project through suitable openings in the rear wall of the cradle. As more thoroughly considered in the previously cited U.S. patent application, the ends of the pins 62 are tapered and shaped to engage the alignment openings of a conventional tape cassette 13 thereby camming the cassette 13 into relative position with respect to the drive and take-up spindles and with respect to a record-playback head 64 as will be subsequently considered.

-Cradle-

The cradle 20 is formed to define a cassette receiving cavity. The surface of the rear wall 60 of the cradle 20 is oriented substantially parallel to the support plate 18 when the cradle is in the operating position (FIG. 3). Additionally, the rear wall 60 of the cradle defines a pair of elongated, spaced guide pin apertures 66 which are positioned to allow the guide pins 62 projecting from the surface of the support plate 18 to pass therethrough. A third relatively large elongated opening 68 is defined by the rear wall 60 of the cradle 20 and serves to allow the take-up 45 and drive 47 spindles to pass therethrough as the cradle 20 is swung to its operating position. Additionally, the cradle 20 includes a pair of opposing side walls 70 and a pair of partial opposing front walls 72. The front walls 72 extend from the ends of the side walls 70 and lie a plane parallel to the rear wall 60 of the cradle 20. Secured to the inner surface of each of the front walls 72 and serving to bias a cassette placed therein against the rear wall 60 of the cradle 20 and upon the guide pins 62 are a pair of resilient leaf springs 74.

Serving to mount the cradle for pivotal movement with respect to the cradle support plate 18, the cradle 20 is formed with a pair of forwardly projecting cradle hinge brackets 76 which extend from the rear wall of the cradle and which are inwardly offset from and lie in a plane substantially parallel to the plane of the side walls 70 of the cradle. Each of the brackets 76 define a circular hole adapted to receive the end of one of the hinge pins 52 thereby pivotally mounting the cradle to the support plate 18. When assembled, the hinge pins 52 are positioned coaxially and the cradle is centered with respect to the cassette support plate 18 by adjusting the position of the hinge pins 52 with respect to the cradle support brackets 76. The upwardly disposed edges of the brackets 76 define a cradle support surface 77 which serves to limit downward cassette movement and roughly locate a cassette within the cavity defined by the cradle 20 prior to more precise positioning by the guide pins 52. The record-playback head 64 is mounted on the cradle 20 so that when the cradle 20 is swung to the operating position (FIG. 3), a cassette carried therein will be cammed by the guide pins 62 passing through guide apertures 66 defined by the cassette body thereby accurately locating the magnetic tape carried by the cassette in alignment with the record-playback 64. Serving to limit pivotal movement of the cradle 20 with respect to the support frame 10 is a cradle stop tab 78 which extends downwardly from the lower edge of the cradle 20 and projects angularly from the plane of the cradle towards the support plate 18.

-Cassette Locking Mechanism-

The cassette locking mechanism 22 serves to securely hold the cassette 13 and the cradle 20 in the operating position. A pair of spaced support studs 80 are spatially secured to one edge of a resilient flat cantilever spring 82 which is sandwiched between a pair of limit brackets 84 each of which carries an adjustable limit screw 85. The studs 80 are mounted to the support plate 18 offsetting the plane of the brackets 84 and the spring 82 from the plane of the support plate 18. Secured to the outwardly disposed edge of the spring 82 is a U-shaped housing 86, the bite of which is downwardly positioned toward the upwardly disposed end of the cradle support plate 18. The rearwardly disposed leg of the U-shaped housing 86 and the upwardly disposed end of the cantilever spring 82 are secured to a bias spring support plate 88. As the spring 82 is flexed, the movement of the housing is limited by one of the adjustable limit screws 85 carried by the limit brackets 84. Mounted within the housing 86 is an innerlock switch 89 which serves to provide a signal indicative of the presence of a cassette in the operating position to control circuitry (not shown). Additionally, secured to the housing 86 is a cassette latch 90 which, in cross-section, defines an accurate camming surface 91 disposed towards the support plate 18. As the cradle 20 is pivoted from the loading position (FIG. 2) to the operating position (FIG. 3) a cassette carried in the cradle 20 will flex the housing 86 in a counterclockwise direction, as viewed in FIG. 2, against the bias of a coil spring 92. The edge of the latch disposed towards the support plate is notched, displaying a shape that conforms to the upper edge of a standard cassette so that when the cassette 13 is in the operating position, the notch holds the cassette 13 downwardly and towards the cradle support plate 18 as illustrated in FIG. 3.

-Tape Position Sensing Assembly-

Figure 5:
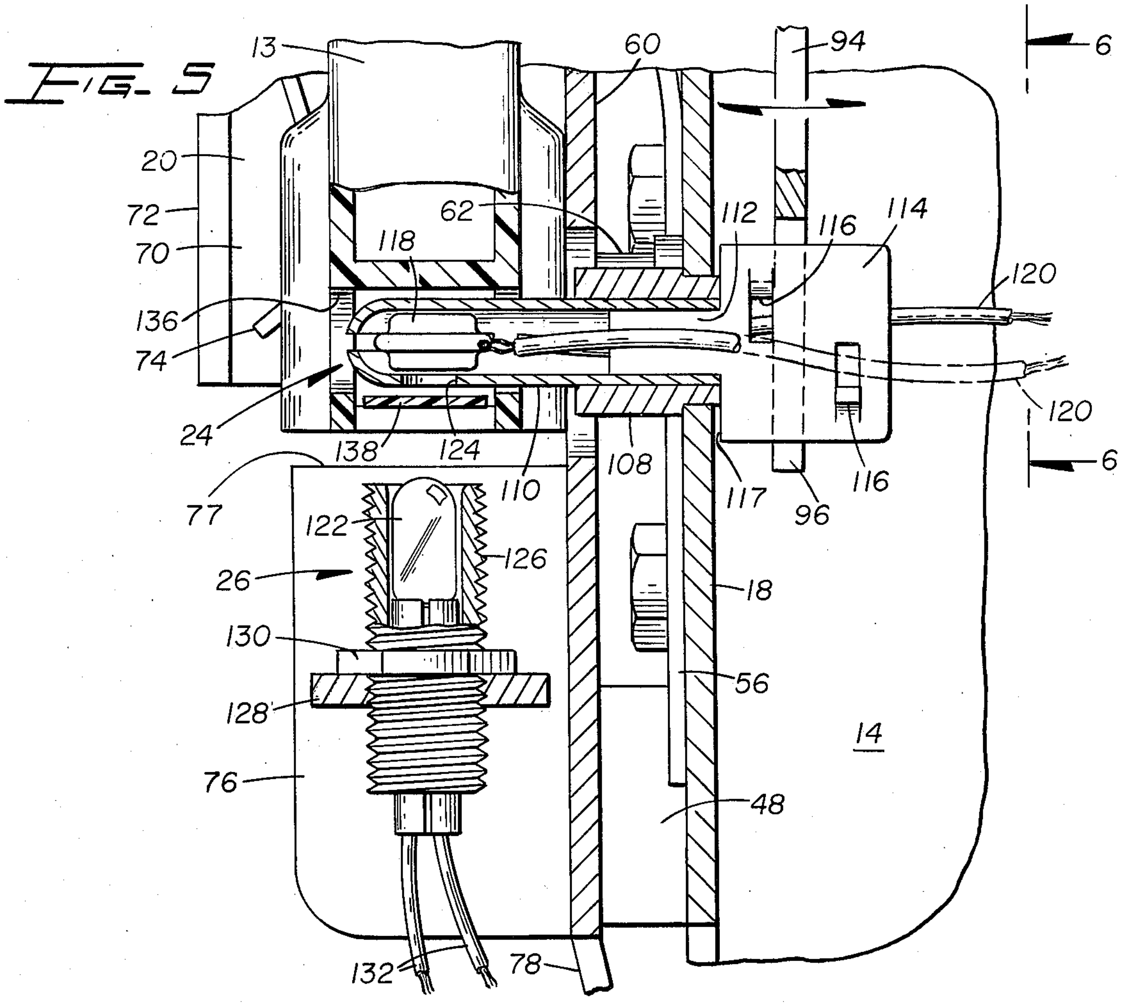
FIG. 5 is an enlarged sectionalized, fragmentary view of a portion of the apparatus of FIG. 3.

The tape position sensing assembly 26 (FIG. 5) includes a pivotally mounted tape sensor lever 94 which, at the lower end, defines a bifurcated sensor arm 96, a sensor arm follower 98 and stop arm 100 at the upwardly disposed end. The follower 98 and stop arm 100 are parallel legs of a U-shaped configuration formed integrally with the lever 94. Each of the arms 98 and 100 define openings adapted to receive a hinge screw 102. The hinge screw, in turn, is passed through openings defined by a support bracket 104 carried on the rear surface cradle support plate 18. The plane of the sensor arm follower 98 is normal to the plane of the cradle support mechanism and thus, the sensor level 94 is pivotally secured to the support plate 18 for pivotal movement in the plane normal to the surface of the support plate 18. Rearwardly extending from a point slightly above the pivot point of the lever 94 is a spring support tab 106. Hooked to the tap 106 is a coil spring 107, the remaining end of which is secured to the spring support bracket 88. Thus, as viewed in FIG. 2, the lever 94 is biased in a counterclockwise direction, forcing follower 98 of the tape position sensor lever 94 towards the cradle support plate 18 for engagement by a camming pin 109 extending from the rear surface of the rear cradle wall 60. Counterclockwise movement is limited by the stop tab 100 abutting the rear surface of the support plate 18.

The bifurcated end 96 of the lever 94 terminates at a point adjacent a sensor opening defined by the cradle support plate 18. Threaded through this opening and securely maintained therein is a sleeve 108 through which slideably moves a tubular sensor casing 110 particularly illustrated in FIG. 5. Into one end of the sensor casing 110 is fitted a drive member 112 defined by a casing drive plate 114. The drive plate 114 is positioned between the fingers of the bifurcated end 96 of the sensor arm 94. Formed with and projecting from the plate 114 on opposite sides of the sensor arm are sensor plate followers 116. Thus, as the lever 94 is pivoted, the sensor casing 110 is forced from its retracted or cassette loading position (FIG. 2) to its extended operative position (FIG. 3) with the leading edge 117 of the drive plate 114 against the sleeve 112. Mounted within the casing 110 for movement therewith is a light sensor 118 which is connected to suitable control circuitry (not shown) by leads 120. Serving to direct illumination to the sensor 118 from a light source in the form of an incandescent bulb 122, is an aperture 124 formed in the lower surface of the wall of the casing 110 in registration with the light sensor 118.

The incandescent bulb 122 is mounted in a cylindrical lamp housing 126, the outer surface of which is threaded into an L-shaped lamp support bracket 128 secured to the inner wall of the cradle hinge bracket 76 as illustrated in FIG. 1. The lamp housing 126 is threaded into the bracket and a lock nut 130 threaded thereabout and tightened into surface contact with the upwardly disposed surface of the bracket 128, the assembly providing a rigid adjustable mounting. Conductor leads 132 of the lamp 122 pass through the lower end of the housing 126 and are connected to a suitable source of filament power (not shown).

-Operation-

As mentioned, the loading position of the apparatus is illustrated in FIG. 2 wherein the cradle is swung in preparation for receipt of the tape cassette 13. The cassette 13 is positioned down into the cradle until the bottom wall of the cassette rests upon the upwardly disposed edges 77 of the cradle hinge brackets 76. Once seated, the cassette 13 and cradle 20 are urged towards the cradle mounting plate 18 camming the latch mechanism 22 upwardly until the upper edge of the cassette 13 drops in the notch defined by the cradle latch 90. In this position, the cassette 13 is impaled upon the guide pins 62 and the take-up 45 and drive 47 spindles engage the take-up and drive reels of the cassette 13. The base of the cassette is urged towards the rear wall of the cradle by the leaf springs 74 mounted upon the front walls 72 of the cradle 20.

As the cradle 20 is swung to the operating position of FIG. 3, the sensor linkage camming pin 109 engages the sensor arm follower 98, pivoting the sensor lever 94 in a clockwise direction, as viewed in FIG. 2, about the pivot screw 102 and against the bias of the sensor linkage coil spring 107. The sensor casing 110 is caused to coaxially slide in the casing sleeve 108 and into a capstan aperture 136 defined by the body of a conventional cassette until the position of FIG. 3 is attained. The length of the camming pin 109 carried on the cradle is selected to assure that the guide pins 62 engage and position the cassette 13 within the cradle 20 before the casing 110 is introduced into the cassette aperture 136. Thus pivotal movement of the lever 94 occurs during the final movement of the cradle just prior to reaching the position of FIG. 3 thereby assuring that the aperture 136 defined by the cassette 13 is located for receipt of the casing 110. In this location, the sensor aperture 124 is in alignment with the lamp 122 maintained in the lamp housing 126. The light passes from the lamp and through the tape 138 carried within the cassette 13. It will be appreciated that when either of the transparent leaders of the tape 138 are in position over the sensing station, the light from the lamp 122 passes through the casing aperture 124 and falls upon the sensor 118 providing a signal indicating the position of the tape in the cassette. As the tape 138 is advanced toward the magnetized portion thereof, which is opaque, the light source to the sensor 118 is interrupted. The resulting signal is utilized to control the clutches 40 and 42 so as to interrupt the direction of tape travel. In this manner overdrive of the tape carried within the cassette is prevented.

An apparatus has been described which provides a unique means for sensing the condition of a tape carried in a tape cassette. Although the invention has been particularly shown and described with reference to a preferred embodiment thereof, it will be understood that various changes in form and detail may be made without departing from the spirit and scope of the invention.

What is claimed:

1. An apparatus for sensing the condition of a tape carried within a tape cassette with respect to a sensing station external to the cassette comprising:

a cradle adapted for receiving a tape cassette, said cradle having a cassette loading position and a record-playback position; and means for sensing a characteristic of the tape within the cassette said characteristic sensing means being movable from an inoperative position to an operative position, the position of said characteristic sensing means being responsive to the positioning of said cradle from said loading to said record-playback position so that said characteristic sensing means is placed in said operative position when said cradle is in said record-playback position.

2. The apparatus of claim 1 wherein said characteristic sensing means includes means responsive to a change in the light transmitting qualities of the tape proximate said sensing station.

3. The apparatus of claim 1 wherein said characteristic sensing means includes a first member positionable from a retracted position outside of said cradle to an extended position within said cradle in response to movement of said cradle between said loading and record-playback positions.

4. The apparatus of claim 3 wherein said characteristic sensing means includes a second member mounted upon said cradle and positioned for cooperative association with said first member when said cradle is moved from said loading to said record-playback position.

5. The apparatus of claim 4 wherein said first and second members are positioned so that the tape within a tape cassette when carried in the cradle is located between said first and second members when the cradle is in said record-playback position.

6. The apparatus of claim 5 wherein said first and second members cooperate to pass a light beam through at least a portion of the tape carried within the cassette.

7. The apparatus of claim 4 which further comprises support means for pivotally supporting said cradle for movement from said loading to said record-playback position, said first member being mounted for actuation in response to the movement of said cradle from said loading position to said record-playback position thereby positionally relating said first member to said second member.

8. The apparatus of claim 7 which further includes a lever pivotally mounted to said support means, one end of said lever operatively engaging said first member and the remaining end of said lever being actuated in response to the movement of said cradle so as to move said first member into positional relation to said second member.

9. The apparatus of claim 7 wherein said first member carries a light sensitive element and said second member carries a light transmitting element so that when said cradle is in said record-playback position the light beam from said light transmitting element is directed toward the tape carried within a cassette positioned within said cradle and therethrough to said light sensitive element.

10. The apparatus of claim 7 wherein said first member is in the form of a light sensitive element and said second member is in the form of a light transmitting element so that when said cradle is in said record-playback position, the light beam from said light transmitting element is directed toward said tape and therethrough to said light sensitive element.

11. An apparatus for sensing the light transmitting characteristics of a tape carried within a tape cassette at a preselected sensing station comprising:

a cradle adapted for receiving the tape cassette, said cradle having a loading and an operating position;

a light source supported upon said cradle;

means for sensing a light level rendered operative in response to the positioning of said cradle from said loading to said operating position; and said light source and said light sensitive means being cooperatively positioned when said cradle is in said operating position so that the light from said light source passes through a transparent portion of the tape onto said light sensitive means.

12. The apparatus of claim 11 which further comprises support means for pivotally supporting said cradle for movement from said loading to said operating position; and an arm pivotally mounted to said support means and carrying said light sensitive means, said arm being positioned for actuation by said cradle when said cradle is pivoted from said loading position to said operating position thereby to locate said light sensitive means within said cradle when said cradle is in said operating position.

13. The apparatus of claim 12 which further includes biasing means for urging said light sensitive means to a retracted position away from said cradle.

14. A method for sensing the position of a tape carried within a tape cassette comprising the steps of:

inserting the cassette within a pivotally supported cradle and with respect to a first tape position sensing element;

pivoting the cradle to engage the drive and take-up reels of the cassette with respective drive and take-up spindles; and inserting a second tape position sensing element into the cassette housing in positional relationship with the first sensing element, said first and second tape position sensing elements cooperating to provide a signal related to the relative position of the tape within the cassette.

15. The method of claim 14 which further comprises the step of passing a beam of light from said first position sensing element through the tape carried within the cassette to said second tape position sensing element.

16. The apparatus of claim 7 which further includes at least one guide pin positioned for insertion into said cradle for engagement with a cassette located therein when said cradle is pivoted from said loading to said record-playback position and serving to accurately orient the cassette within said cradle, said first member being actuated for insertion into the cassette subsequent to the orientation of the cassette by said guide pin.

* * * * *

Disclaimer 3,909,845.—*Kurt Rothlisberger*, Morton Grove, and *Richard F. Vee*, Chicago, Ill. APPARATUS AND METHOD FOR SENSING THE CONDITION OF A TAPE WITHIN A TAPE CASSETTE. Patent dated Sept. 30, 1975. Disclaimer filed Feb. 9, 1978, by the assignee, *Teletype Corporation.*

Hereby enters this disclaimer to claim 1 of said patent.

[*Official Gazette April 18, 1978.*]